US012512139B2

(12) United States Patent
Parkin et al.

(10) Patent No.: US 12,512,139 B2
(45) Date of Patent: Dec. 30, 2025

(54) METHOD FOR SWITCHING MAGNETIC MOMENTS IN MAGNETIC MATERIAL USING SEEDED SPIN-ORBIT TORQUE

(71) Applicant: MAX PLANCK GESELLSCHAFT ZUR FÖRDERUNG DER WISSENSCHAFTEN EV, Munich (DE)

(72) Inventors: Stuart S.P. Parkin, Halle (DE); Banabir Pal, Halle (DE); Binoy Krishna Hazra, Halle (DE); See-Hun Yang, Halle (DE)

(73) Assignee: MAX PLANCK GESELLSCHAFT ZUR FÖRDERUNG DER WISSENSCHAFTEN EV, Munich (DE)

( * ) Notice: Subject to any disclaimer, the term of this patent is extended or adjusted under 35 U.S.C. 154(b) by 195 days.

(21) Appl. No.: 18/573,206

(22) PCT Filed: Jun. 15, 2022

(86) PCT No.: PCT/EP2022/066318
§ 371 (c)(1),
(2) Date: Dec. 21, 2023

(87) PCT Pub. No.: WO2022/268604
PCT Pub. Date: Dec. 29, 2022

(65) Prior Publication Data
US 2024/0371424 A1    Nov. 7, 2024

(30) Foreign Application Priority Data

Jun. 23, 2021    (EP) .................................... 21181124

(51) Int. Cl.
*G11C 11/00*    (2006.01)
*G11C 11/16*    (2006.01)
(Continued)

(52) U.S. Cl.
CPC ........ *G11C 11/161* (2013.01); *G11C 11/1673* (2013.01); *G11C 11/1675* (2013.01);
(Continued)

(58) Field of Classification Search
CPC .............. G11C 11/161; G11C 11/1673; G11C 11/1675; G11C 11/18
See application file for complete search history.

(56) References Cited

U.S. PATENT DOCUMENTS

| | | | |
|---|---|---|---|
| 6,819,586 B1* | 11/2004 | Anthony | G11C 11/16 365/158 |
| 2005/0078509 A1* | 4/2005 | Parkin | G11C 11/15 365/158 |

(Continued)

FOREIGN PATENT DOCUMENTS

EP    3474281 A1    4/2019

OTHER PUBLICATIONS

Duine et al., "Synthetic antiferromagnetic spintronics," Nature Physics, vol. 14, (2018). pp. 217-219.
(Continued)

*Primary Examiner* — Pho M Luu
(74) *Attorney, Agent, or Firm* — ProPat, LLC; Cathy R. Moore

(57) ABSTRACT

A method for switching magnetic moments in a magnetic material by:
a) heating a system comprising formed from a layer of magnetic material and a layer of a metal contact with contacting and forming an interface with one surface of the magnetic material layer,
the heating step increasing the temperature to at least 1 to 100 K above the blocking temperature of the magnetic material, (Continued)

b) applying current pulses having a fall time to the system at least at a point in time when the system is heated to at least 1 to 100 K above the blocking temperature of the magnetic material, thereby generating a spin texture in the magnetic material layer and c) then cooling the system to a temperature of below the blocking temperature at a cooling rate which is greater than the current pulses fall time, thereby setting the spin texture in the magnetic layer.

18 Claims, 12 Drawing Sheets

(51) Int. Cl.
    *G11C 11/18*     (2006.01)
    *H01F 10/32*     (2006.01)
    *H10B 61/00*     (2023.01)
    *H10N 50/10*     (2023.01)
    *H10N 50/85*     (2023.01)
    *H10N 52/80*     (2023.01)

(52) U.S. Cl.
    CPC .......... *G11C 11/18* (2013.01); *H01F 10/3268* (2013.01); *H10B 61/00* (2023.02); *H10N 50/10* (2023.02); *H10N 50/85* (2023.02); *H10N 52/80* (2023.02)

(56) References Cited

U.S. PATENT DOCUMENTS

2019/0006581 A1*   1/2019   Eom ..................... G11C 11/165
2020/0013444 A1    1/2020   Min et al.

OTHER PUBLICATIONS

International Search Report for corresponding PCT/EP2022/066318, filed on Jun. 15, 2022.

Liu et al., "Current-Induced Switching of Perpendicularly Magnetized Magnetic Layers Using Spin Torque from the Spin Hall Effect," Physical Review Letters, vol. 109, (2012), pp. 096602-1 to 096602-5.

Miron et al., "Perpendicular switching of a single ferromagnetic layer induced by in-plane current injection," Nature, vol. 476, (2011), pp. 189-193.

Parkin et al., "Memory on the racetrack," Nature Nanotechnology, vol. 10, (2015), pp. 195-198.

Takeuchi et al., "Chiral-spin rotation of non-collinear antiferromagnet by spin-orbit torque," Nature Materials, vol. 20, (2021), pp. 1364-1370.

Zhang et al., "Giant facet-dependent spin-orbit torque and spin Hall conductivity in the triangular antiferromagnet IrMn3," Science Advances, vol. 2, (2016), pp. e1600759 1-8.

* cited by examiner

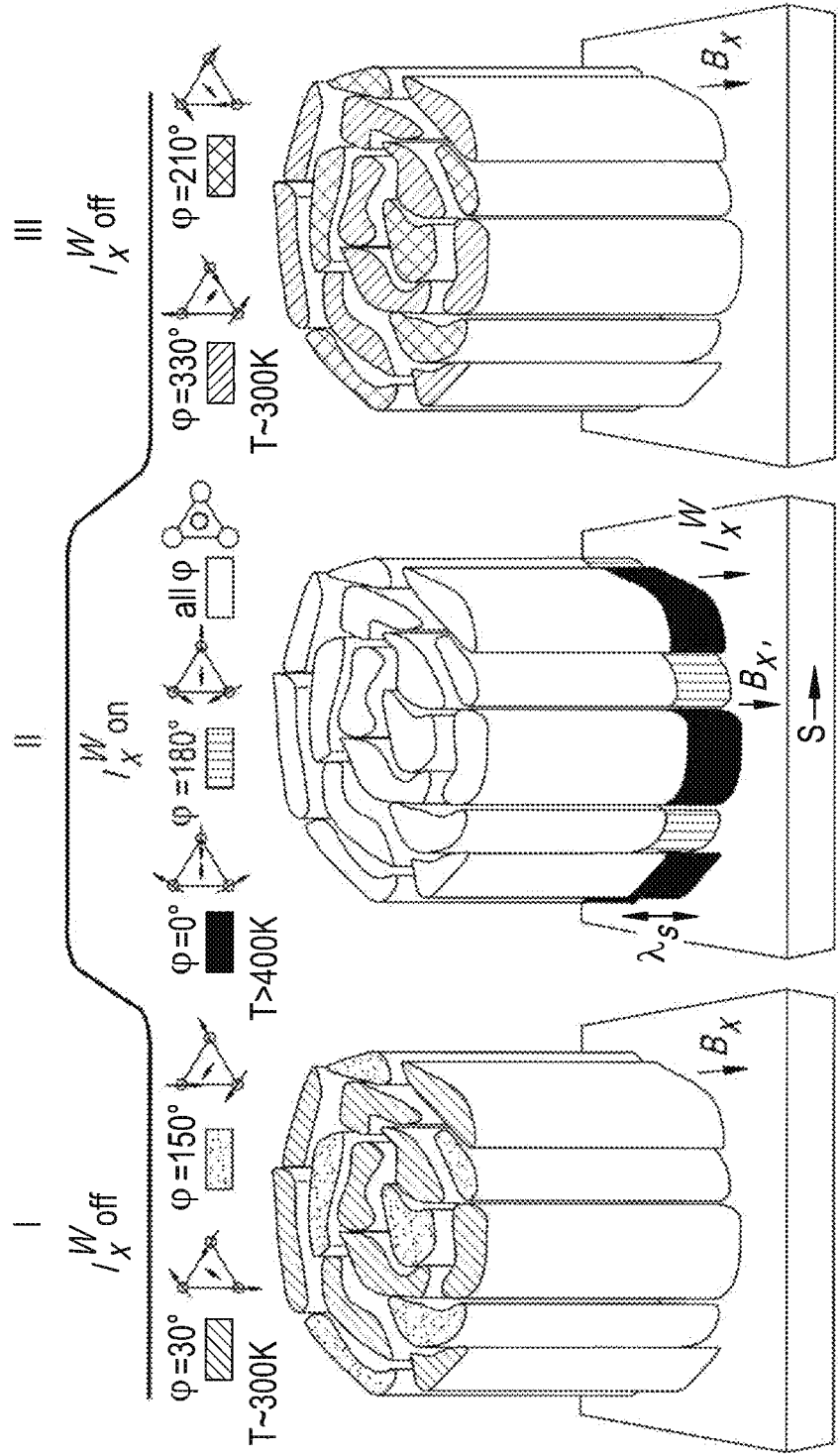

φ(°)

METHOD FOR SWITCHING MAGNETIC MOMENTS IN MAGNETIC MATERIAL USING SEEDED SPIN-ORBIT TORQUE

CROSS-REFERENCE TO RELATED APPLICATIONS

This application is being filed under 35 U.S.C. § 371 as a National Stage Application of pending International Application No. PCT/EP2022/066318 filed Jun. 15, 2022, which claims priority to the following parent application: European Patent Application No. 21181124.5, filed Jun. 23, 2021. Both International Application No. PCT/EP2022/066318 and European Patent Application Ser. No. 21/181,124.5 are hereby incorporated by reference herein in their entirety.

FIELD OF THE INVENTION

The present invention relates to methods for switching magnetic moments using seeded spin-orbit torque.

BACKGROUND

Manipulation, specifically current-induced manipulation of magnetization is critical to a new generation of spintronic technologies, e.g. in the field of quantum computing or neuromorphic computing. Second-generation MRAM techniques are in development, such as thermal-assisted switching (TAS) and spin-transfer torque (STT). Specifically, antiferromagnetic storage media have been studied as an alternative to ferromagnetism, especially since with antiferromagnetic material the bits can be stored as well as with ferromagnetic material. Instead of the usual definition 0=magnetization upwards, 1=magnetization downwards, the states can be, e.g., 0=vertically-alternating spin configuration and 1=horizontally-alternating spin configuration. The main advantages of antiferromagnetic material are
- insensitivity to data-damaging perturbations by stray fields due to zero net external magnetization;
- no effect on near particles, implying that antiferromagnetic device elements would not magnetically disturb its neighboring elements;
- far shorter switching times (antiferromagnetic resonance frequency is in the THz range compared to GHz ferromagnetic resonance frequency);
- broad range of commonly available antiferromagnetic materials including insulators, semiconductors, semimetals, metals, and superconductors.

Research is also directed to how to read and write information to antiferromagnetic spintronics as their net zero magnetization makes this difficult compared to conventional ferromagnetic spintronics. In modern MRAM, detection and manipulation of ferromagnetic order by magnetic fields has largely been abandoned in favor of more efficient and scalable reading and writing by electrical current. Methods of reading and writing information by current rather than fields are also being investigated in antiferromagnets as fields are ineffective anyway. Writing methods currently being investigated in antiferromagnets are through spin-transfer torque and spin-orbit torque from the spin Hall effect and the Bychkov-Rashba effect. Another design, the so-called racetrack memory, encodes information in the direction of magnetization between domain walls of a ferromagnetic wire.

In regard of these recent developments, antiferromagnets (AFs), with nearly zero net magnetization, are highly attractive. Yet, an important goal which still needs to be realized in order to exploit the full potential of a AF device is the setting and switching of the magnetic configuration of the AF.

PRIOR ART

It has been long known that antiferromagnetic and ferrimagnetic materials with nearly compensated magnetization have unique properties that make them technologically relevant (R. A. Duine, K.-J. Lee, S. S. P. Parkin, M. D. Stiles, Synthetic antiferromagnetic spintronics. Nat. Phys. 14, 217-219 (2018); S. Parkin, S.-H. Yang, Memory on the racetrack. Nat. Nanotechnol. 10, 195-198 (2015)). Recently, chiral spin textures have received much attention because they display properties reminiscent of ferromagnets, such as, especially, large anomalous Hall effects (AHE) even though they may have zero magnetization. As stated above, an important goal to realize the device potential of AFs is the setting and switching of their magnetic configuration. The observation of a spin Hall effect (SHE) in chiral AFs (W. Zhang et al., Giant facet-dependent spin-orbit torque and spin Hall conductivity in the triangular antiferromagnet $IrMn_3$. Sci. Adv. 2, e1600759 (2016)) suggests that spin currents could switch their magnetic configurations. Spin currents generated by the SHE in heavy metals have been used to switch the magnetization of ferromagnetic (FM) layers (I. M. Miron et al., Perpendicular switching of a single ferromagnetic layer induced by in-plane current injection. Nature 476, 189-193 (2011); L. Liu, O. J. Lee, T. J. Gudmundsen, D. C. Ralph, R. A. Buhrman, Current-Induced Switching of Perpendicularly Magnetized Magnetic Layers Using Spin Torque from the Spin Hall Effect. Phys. Rev. Lett. 109, 096602 (2012)) but only thin layers in the order of 1-3 nm can be switched due to the short spin diffusion lengths in these systems.

EP 3 474 281 A discloses a method of operating an antiferromagnetic memory device comprising generating at least one current pulse in an antiferromagnetic region of an antiferromagnetic memory device. An effective portion of the or each current pulse has a duration less than 250 ps and a magnitude which is sufficiently high so as to induce a staggered spin-orbit field strong enough to switch magnetic moments in at least a portion of the antiferromagnetic region.

PROBLEM TO BE SOLVED

Specifically with AF devices the reliable and reproduceable switching and setting—specifically permanent setting—of the magnetic configuration is still a problem. Moreover, with the known techniques only antiferromagnetic layers with thicknesses in the range of 1 to 5 nm can be switched (=effective thickness). Aside from solving the above problem it was, therefore, also an object of the present invention to increase the effective thickness of the AF layer to at least 50 nm, preferably at least 80 nm, more preferred to at least 100 nm.

BRIEF DESCRIPTION OF THE INVENTION

According to the present invention layers of a magnetic material can be switched via a thermodynamic process of Seeded Spin-Orbit Torque, optionally under an applied magnetic field. In this switching process a current seeds the magnetic configuration of the magnetic material at the interface with a metal layer whilst the magnetic material is heated above its blocking temperature. This switching of the magnetic configuration initially only occurs to a depth of about 1 to 5 nm into the magnetic material, called the interfacial seed layer. Yet, the interfacial seed layer then sets the resulting spin texture of the entire layer of the magnetic material within a thickness of at least 50 nm, preferably at least 80 nm, more preferred to at least 100 nm as it cools to a temperature of below the blocking temperature unless the current pulses' fall time is below the cooling time. The threshold-current density for switching is independent of layer thickness and an optionally applied magnetic field but the latter strongly influences the resulting magnetic domain configuration.

Thus, the present invention relates to a method for switching magnetic moments in a magnetic material, comprising the steps of:
  a) heating a system comprising
    a layer of the magnetic material and
    a layer of a metal which is in contact with at least one surface of the magnetic material layer, thus forming an interface with the magnetic material layer
  to at least 1 to 100 K above the blocking temperature of the magnetic material,
  b) applying current pulses to the system, at least at a point in time when the system is heated to at least 1 to 100 K above the blocking temperature of the magnetic material, wherein the current pulses have a current pulse fall time, thereby generating a spin texture in the magnetic material layer and
  c) then cooling the system to a temperature of below the blocking temperature at a cooling rate which is greater than the current pulses fall time, thereby setting the spin texture in the magnetic layer.

BRIEF DESCRIPTION OF THE DRAWINGS

FIG. 3A is a schematic illustration of a proposed SSOT switching mechanism.

DEFINITION OF TERMS

Figure 1A:
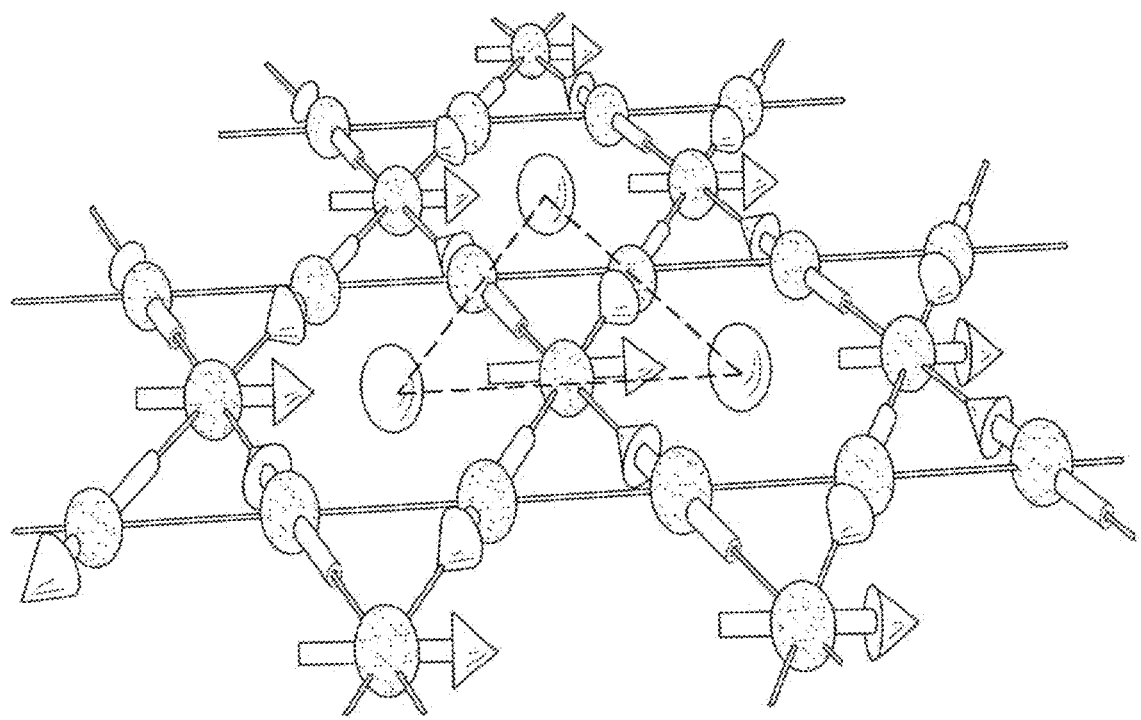
FIG. 1A is a schematic illustration of the kagome lattice plane of $Mn_3Sn$.
Figure 1B:
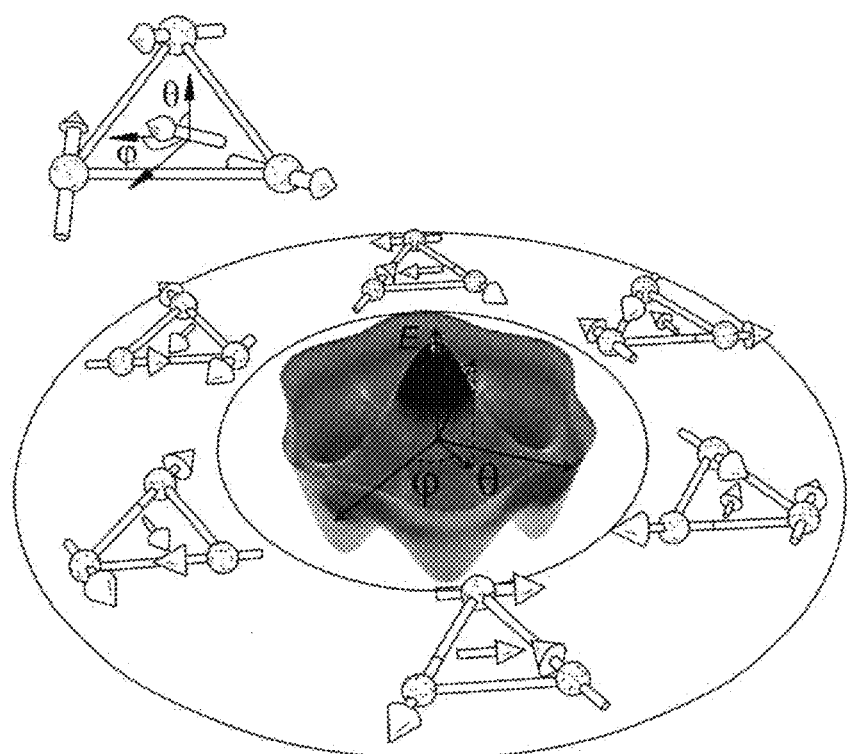
FIG. 1B is a schematic illustration of the 3D energy landscape associated with $Mn_3Sn$.

"Magnetic material" means ferrimagnetic and ferromagnetic material as well as normal and chiral antiferromagnetic (AF) material but excludes paramagnetic and diamagnetic material.

"Metal" means any metallic element or compound, including topological metals (e.g. Dirac metal, Weyl semimetal). Preferred metals are heavy metals, which are metals in which there is—preferably significant—spin orbit coupling so that a layer of this metal can generate a spin current by conversion of an electrical current or current of charged electrons into a spin current. Typically, the heavier (atomic mass Z) the metal the larger is the spin orbit coupling. Examples of heavy metals that can be used in this invention are, e.g. W, Au, Ag, Pt, Pd etc. There are several mechanisms by which the current conversion can take place including, especially, the spin Hall effect (SHE), in which a longitudinal electrical current generates a pure spin current (that carries no net charge) of spin-polarized electrons. This conversion mechanism has an efficiency (spin current to charge current) that is defined by a so-called spin Hall angle (SHA). For example, the SHA for platinum is ~0.20 and for W is ~−0.30. For oxidized W the SHA is about −0.50. The spin current is chiral which means that the spin current flows perpendicular to the charge current and is polarized in a direction perpendicular both to this direction and to the charge currents flow direction, either clockwise or anti-clockwise. The higher the absolute SHA values, the better. For so-called topological metals the SHA has been claimed to even exceed 1 which means that each electron in the electrical current generates one spin polarized electron.

"Blocking temperature" is a temperature at which the magnetic moments of a magnetic material are thermally excited but neighboring moments are still oriented to some degree with respect to each other by the exchange interaction. At a higher temperature than the blocking temperature, for example at the magnetic ordering temperature—which is the Néel temperature for an antiferromagnetic material and the Curie temperature for a ferromagnetic material—thermal excitations overcome the exchange interaction so that the magnetic moments individually rotate randomly in any direction. When a magnetic field is applied to a magnetic material at a temperature above the blocking temperature, this field, if large enough, can cause the magnetization to be aligned along the magnetic field direction but when the field is reduced to zero the magnetization will also go to zero, whereas below the blocking temperature the magnetization will typically have a non-zero value in zero magnetic field for certain directions defined by the magnetic anisotropy of the crystal. Typically, the blocking temperature, which is associated with the magnetic anisotropy energy that aligns the moments along preferred directions in the crystal lattice, is a temperature that can readily be distinguished from the magnetic ordering temperature. The difference in temperature of the blocking temperature and the magnetic ordering temperature may be 10-20% of the magnetic ordering temperature, with the blocking temperature being lower than the magnetic ordering. Whether the difference is closer to the 10% or closer to the 20% will depend on the origin of the magnetic anisotropy. In any case, for the purposes of this invention the blocking temperature is a temperature that is between 10% and 20%, preferably between 12% and 18%, more preferred about 15% below the magnetic ordering temperature of the magnetic material. The magnetic ordering temperature of single crystal materials can be found from the literature. Typically films display very similar temperatures to the bulk materials unless they are very thin (1-2 unit cells thick) when the ordering temperature will typically be reduced and thus less heating will be needed for the purpose of this invention. The magnetic ordering temperature of a given thin film can be determined by measuring the variation with temperature of any property that is derived from the sample having a finite magnetic moment. For example, this property can be the magnetization of the sample in an applied magnetic field that can be measured using a magnetometer, such as a SQUID magnetometer or a vibrating sample magnetometer or a torque magnetometer. This property can be an optical property such as the Magneto-optical Kerr effect that is measured by reflecting light with a given linear polarization from the sample and measuring the change in the polarization for the light, or similarly the Faraday effect, that is measured by transmitting a beam of light through the sample (provided the substrate is transparent to light of the given wavelength that is used). Another property is a magneto-transport property such as the anomalous Hall effect or topological Hall effect.

"Domain configuration" and "Spin texture": An antiferromagnetic material can display magnetic domains in which the individual magnetic moments may be aligned along different directions with respect to the underlying crystal lattice. For example, $Mn_3Sn$ has a hexagonal structure and the magnetic moments prefer to be oriented within the hexagonal basal plane. Within this plane there are 6 equivalent directions that are related by hexagonal symmetry so there can be 6 equivalent antiferromagnetic domains (=6 domain configurations; see FIG. 1a, b or c). The magnetic moments can also be arranged in different ways with respect to each other but will always be aligned so that the magnetic anisotropy energy is minimized. This state is called a spin texture. Thus, the spin texture corresponds to the number and degree to which each of these distinct domains are populated. When a SOT is applied the spin textures can be reoriented or set by the SOT so that one or more of the possible domains is favored. These spin textures may not be the same as those favored by the magnetic anisotropy so that when the SOT is turned off these spin textures may relax to those that are favored by the anisotropy and which are closest in energy. Thus there may be one or more domains that are favored or populated by SOT but these populations may evolve when the SOT is switched off to favor the population of domains or spin textures that rather minimize the magnetic anisotropy energy. Nevertheless the SOT can change the population of domains and, in this way, can reset the overall magnetic structure of the magnetic film or nano-object.

"Setting" means creating domains with a certain distinct population of magnetic moments. The process according to the present invention allows the creation of different domains with different populations by applying different combinations of current and field.

DETAILED DESCRIPTION OF THE DRAWINGS

FIG. 1: Six-fold magnetic ground state and field-induced switching in $Mn_3Sn$. (A) Mn atoms (black spheres) in $Mn_3Sn$ (hexagonal crystal system with space group $P6_3/mmc$) constitute a kagome lattice plane in which Sn atoms (purple spheres) occupy the center of each hexagon of the kagome lattice. The blue dotted lines, connecting the three central Mn atoms and their nearest Sn atoms, show the directions of the easy axes within the kagome plane. (B) 3D energy landscape associated with the six-fold degenerate magnetic configuration of $Mn_3Sn$ is shown schematically where $\varphi$ and $\theta$ denote the rotation of the net moment m (green arrow) within the kagome plane and out of the kagome plane, respectively. (C) The six energetically degenerate ground states and intermediate excited states of a Mn triangle are shown along with the 2D energy landscape along $\varphi$ direction (for $\theta=0$). For the creation of this diagram we have minimized the Hamiltonian (1) which resulted in the six ground state configurations $\varphi=30°, 90°, 150°, 210°, 270°, 330°$ shown in the bottom. Between these angles, we have interpolated the configuration with respect to the individual moments' polar angles. This resulted in six degenerate energy maxima for $\varphi=0°, 60°, 120°, 180°, 240°, 300°$ shown above. The resultant magnetic moment, m (green arrow), of the ground state in each triangle points towards any of the six e easy axes directions. (D) Anomalous Hall resistance of a 30 nm $Mn_3Sn/8$ nm W bi-layer sample measured at 300 K with 1 mA applied current in a standard Hall bar geometry, shown in the top panel of FIG. 1D. The magnetic field $B_z$ is applied along the 'z' axis perpendicular to the plane of the Hall bar and the current is along the 'x' axis. (E) Schematic representation of the field-induced switching where the system switches between $\varphi=90°$ and $\varphi=270°$ domain configurations. (F) $\Delta R_{xy}$ and $H_c$ versus sample temperature.

FIG. 2: Current-induced Seeded SOT switching in $Mn_3Sn$. (A) Current-induced switching in 30 nm $Mn_3Sn/8$ nm W bi-layer sample measured at 300 K. The data shown in (A) correspond to positive (blue) and negative (red) in-plane bias fields $B_x=\pm 0.1$ T. A constant background signal was subtracted from both datasets. (B) Theoretical description of current-induced SOT switching in the presence of a bias field $B_x=+0.1$ T for the magnetic configurations $\varphi=150°, 210°$ (blue and red) in presence of the current density J. (C) Current-induced switching at 300 K for three different current pulse lengths ($\tau_L$). Here, the same current pulse was used for both writing and reading. Inset in (C) shows background subtracted switching behavior which qualitatively agrees with (B). (see section 3 of SM for background subtraction process) (D) Similar switching experiments at different temperatures for a selected writing $\tau_L \sim 1$ msec. (E) Dependence of $J_c$ on current pulse length and measurement temperature. (F) Variation of switching ratio ($\xi$) and critical current density ($J_c$) with film thickness.

FIG. 3: Seeded spin-orbit torque (SSOT) switching mechanism. (A) Schematic illustration of SSOT. One possible initial spin configuration is shown in (I) with two different sets of domains (blue and green corresponding to $\varphi=30°, 150°$) both characterized by $m_z=+0.5$ m. (II) When a large current density is applied the domains thermally fluctuate (various $\varphi$, red domains). Only in a thin region at the interface, the domains are oriented along $\varphi=0°$ or $180°$ (dark and light gray), due to SOT, which subsequently seeds the entire layer when the system cools. The final spin configurations are shown in (III) where $\varphi=330°, 210°$ (orange and violet) domains are populated. (B) The dependence of the switching ratio, ξ, on voltage pulses of various lengths and distinct rise and fall times are shown in B. Switching in presence of voltage pulses of (i) narrower $\tau_L$ with fast fall time and (ii) longer $\tau_L$ with slow fall time, are shown schematically in top panel. Here, T* represents the blocking temperature and S* denotes the critical spin current density necessary to switch when the system is above T*. The time required for the system to relax below T* and S* is shown by $t_{T*}$ and $t_{S*}$, respectively. For longer $\tau_L$ with slow fall time (case-II), the system cools below T* in presence of S* because $t_{S*} > t_{T*}$ and hence ξ is ~40%. For narrower $\tau_L$ with fast fall time (case-I), the system cools below T* in absence of S* because $t_{S*} < t_{T*}$ and hence ξ is <<40%.

FIG. 4: Current-induced switching in the presence of different in-plane bias fields $B_x$. (A) Variation of $R_{xy}$ on $B_x$ during current induced switching. Dependence of $J_c$ (B), and $\Delta R_{xy}$ (C) on $B_x$. Black (+$B_x$, -$J_x$), red (+$B_x$, +$J_x$), green (-$B_x$, -$J_x$) and blue (-$B_x$, +$J_x$) shows negative and positive current sweep for positive and negative $B_x$, respectively. For details check section 7 of SM. (D, E) Magnetic energy landscape of $Mn_3Sn$. When m lies within the kagome plane (θ=0), the total energy (E) exhibits a six-fold degeneracy, as a function of φ, and the energy gap between the ground state and the excited state is high (case c in D and E). However, if m tilts out of the kagome plane (θ≠0), the energy gap between the ground and excited states decreases progressively with increase in θ (case b and a). This favors a random domain population and will lead to a smaller $\Delta R_{xy}$ during switching.

FIG. 5: Dependence of current-induced switching on magnetic field orientation within the xz plane. (A) Schematic of measurement protocol. (B) $R_{xy}$ as a function of ψ in the xz plane. A combination of field-induced and current-induced switching creates four distinct magnetic states as shown by blue and red hysteresis lines for different values of ψ. (C) Switching from positive B (+0.1 T) hysteretic loop to negative B (-0.1 T) hysteretic loop for ψ=10°.

DETAILED DESCRIPTION OF THE INVENTION

The process according to the invention, also called "Seeded Spin Orbit Torque (SSOT) switching", involves the setting of the domain configuration at the interface of the magnetic layer with a metal layer that seeds the subsequent setting of the domain configuration of the entire layer via exchange. The mechanism is thermodynamic in nature and involves bringing the temperature of the AF layer above its corresponding blocking temperature and then cooling it in the presence of a SOT provided by spin current from the adjacent metal layer. In this regard this mechanism is believed to be analogous to that of the formation of exchange bias fields at the interface between an AF layer and a ferromagnetic (FM) layer. In the latter case, when the bilayer is cooled from above the AF blocking temperature in a magnetic field, the exchange interaction provided by the magnetized FM layer across the atomically thin AF/FM interface sets the AF domain configuration at the interface, which then seeds the entire AF layer as it is cooled (W. Zhang et al., Giant facet-dependent spin-orbit torque and spin Hall conductivity in the triangular antiferromagnet $IrMn_3$. Sci. Adv. 2, e1600759 (2016); W. Zhu, L. Seve, R. Sears, B. Sinkovic, S. S. P. Parkin, Field Cooling Induced Changes in the Antiferromagnetic Structure of NiO Films. Phys. Rev. Lett. 86, 5389-5392 (2001); J. M. Taylor et al., Epitaxial growth, structural characterization, and exchange bias of noncollinear antiferromagnetic $Mn_3Ir$ thin films. Phys. Rev. Mater. 3, 074409 (2019)). In the process according to the invention, the SOT generated by a current which flows through a metal layer seems to play a similar role to the exchange provided by the FM.

Accordingly, the seeded SOT switching mechanism works by the operation of an electrical current that is passed through the metal layer that generates a spin current that diffuses into the magnetic layer that is to be set or reset. Thereby a SOT is generated that acts only on a portion of the magnetic layer that is adjacent to the metal layer, the seed layer. This is because the spin current will be depolarized within a short distance that is typically thinner that the thickness of the magnetic layer of this invention. The same current (or a second current, see below) that passes through the magnetic layer and the metal layer generates heat via Joule resistive heating. When the temperature of the magnetic layer exceeds the blocking temperature the magnetization of the seed layer will be set by the SOT and the magnetization of the rest of the magnetic layer will follow that of the seed layer by exchange. The entire layer will be subject to thermal fluctuations. However, if the current is turned off at a sufficiently slow speed compared to the cooling rate of the magnetic layer then the SOT will continue to be applied while the sample cools. Thus, the entire layer will cool into the state set by the SOT within the seed layer. Since the SOT is proportional to the magnitude of the current but the heating is proportional to the current to the power 2 this mechanism is possible.

In another embodiment of this invention two currents can be used. For example in a 3-terminal (3T) geometry a heating current can be passed vertically through the magnetic layer for the purpose of heating while a smaller SOT current can be passed through the metal layer for the purpose of creating an SOT. In this case the SOT current can remain active while the heating current is applied and then removed. For example, the heating current can be applied prior to the SOT current, and once the magnetic material is heated above the blocking temperature the heating current can be removed while the SOT current continues to be applied until the magnetic material cools to below the blocking temperature.

In a further embodiment of the invention the seeding effect of the SOT may be supported by an external magnetic field. A magnetic field of a given direction and magnitude, in combination with the current, preferably along a certain direction in the plane of the film, can support the setting of the desired spin texture in the magnetic material.

In a first step of the process according to the present invention a laminate of a film of a magnetic material and a metal film is prepared.

The planar dimensions of the two films are preferably identical but also other laminate designs are possible, wherein one of the two films has a planar dimension of less than the planar dimension of the other film. Typical planar dimensions of the films range from MRAM dimensions to Racetrack dimensions, which means from about 10 nm·10 nm to 100 nm·100 nm (MRAM) to 10 nm·1 μm to 100 nm·10 μm (Racetrack).

The thickness of the magnetic material film is at least 10 nm, preferably at least 20 nm, more preferred at least 50 nm.

The thickness of the metal film typically is at least 3 nm, preferably at least 5 nm, more preferred at least 10 nm.

The individual films can be prepared with various techniques, depending on the kind of material. Films can be prepared from the elements, alloys or homogenous element mixtures. Manufacturing techniques such as chemical solution deposition (CSD), spin coating, chemical vapor deposition (CVD), plasma enhanced CVD, atomic layer deposition (ALD), molecular layer deposition (MLD), electron beam evaporation, molecular beam epitaxy (MBE), sputtering, pulsed laser deposition, cathodic arc deposition (arc-PVD) or electrohydrodynamic deposition can be used to manufacture the films. For example films can be prepared by (co-) sputtering of the elements, eventually on top of a substrate. If it is desired to provide a film with a surface having a predefined crystallographic orientation, (co-) sputtering can be performed by way of epitaxial growth on a corresponding substrate exhibiting the desired crystallographic orientation with identical or similar unit cell dimensions as the to be grown compound. All of the above methods are generally known in the art.

The laminate of the two films preferably can either be prepared in situ by successively depositing the two layers one after the other or by any other known lamination technique which can be used for a given layer composition. The prepared film laminate can be patterned into any desired geometry e.g. using conventional photo-lithography techniques. Electrical contacts can be attached to the patterned device using e.g. conventional photo-lithography and lift-off process.

The two layer laminate film is then heated to above the blocking temperature of the magnetic material. Preferably the two layer laminate film is heated to above the ordering temperature of the magnetic material. Heating can be affected by any means known in the art, such as thermal conduction, thermal convection, thermal radiation, and/or transfer of energy by phase changes. Since the flow of an electrical current is involved in the inventive process anyhow for generating the SOT, electrical current is preferably be used for heating the laminate film via Joule resistive heating. This electrical heating current may be the same current that is used for seeding the magnetic layer (see below), but it may as well be an additional current that has a different flow path than the switching current (see below). A current flow path is typically set and defined by the distance between the electrodes.

In order to seed the desired magnetic moment in the magnetic material an electrical current (the switching current) is passed through the metal layer in a direction so that it generates a spin current in the desired direction (the SOT) that diffuses into the magnetic layer that is to be set or reset. Typically, the flow direction of the electrical current is perpendicular to the generated spin current. In order to set or reset the magnetic ordering of moments, the temperature of the magnetic material should preferably be above the blocking temperature, more preferred at or above the magnetic ordering temperature (Curie or Néel temperature) at the time of passing the switching current through the metal layer. Most preferred the temperature is at least 1 to 100 K above the blocking temperature. The electrical current is preferably applied in the form of current pulses having a current pulse raise time, optionally a current pulse hold time and a current pulse fall time. While the current pulse raise time and hold time is not critical as long as a switching current is generated, the current pulse fall time is critical (see below).

Once the temperature is at least 1 to 100 K above the blocking temperature the laminate film is cooled to a temperature of below the blocking temperature at a cooling rate which is greater (faster) than the current pulses fall time, thereby setting the spin texture in the magnetic layer. The current pulse fall time is the time that elapses when the current is reduced from a switching current level to zero. Accordingly, it is important that the spin current is maintained while the laminate—and, thus, the magnetic layer—is cooled through its blocking temperature. Cooling of the laminate film is typically performed by switching off the heating means, e.g. the electrical heating current. This delayed "decaying" of the switching current also works if the switching current is the only heating source, i.e. if no additional heating source is applied. The SOT is proportional to the magnitude of the current but the heating is proportional to the current to the power 2. Therefore, the heating "decays" faster than the spin current, so that this mechanism is possible.

The current pulse fall time preferably exceeds the cooling rate of the magnetic material at least in the vicinity of the blocking temperature, which means about 20 K, preferably 15 K and more preferred about 10 K above and preferably also below the blocking temperature. Since the films of the employed materials are very thin, cooling from a temperature of above the magnetic ordering temperature or blocking temperature to about room temperature) (~23° C.)—which preferably corresponds to the temperature below the blocking temperature—typically only takes 10-20 ns, so that the current pulse fall time must be greater than 20 ns, preferably >30 ns, more preferred >50 ns when the heating of the material is stopped in order to achieve permanent switching of the magnetic moments. Of course, if the magnetic material's cooling rate is faster than 10-20 ns, also shorter current pulse fall times can be used.

The current density through the magnetic material preferably is in the range of $10^6$-$10^{10}$ A·cm$^{-2}$, preferably $10^7$-$10^9$ A·cm$^{-2}$ more preferred about $1 \cdot 10^7$-$3 \cdot 10^7$ A·cm$^{-2}$.

The seeding effect of the SOT may be supported by an external magnetic field. A magnetic field of a given direction and magnitude, in combination with the switching current can support the setting of the desired spin texture in the magnetic material. Preferably the direction of the magnetic field is along a certain direction in the plane of the film along (one of) the easy axes. Preferred field strengths are 10-1000 Oe, more preferred 10-500 Oe and most preferred 10-100 Oe.

ADVANTAGES OF THE INVENTION

As of today, specifically with AF devices the reliable and reproducible switching and setting—specifically permanent setting—of the magnetic configuration is still a problem. Moreover, with the known techniques only antiferromagnetic layers with thicknesses in the range of 1 to 5 nm (=effective thickness) can be switched.

The present invention provides a reliable and reproducible switching and setting—specifically permanent setting—of the magnetic configuration of a magnetic material and accordingly provides advantages to a new generation of spintronic technologies, e.g. in the field of quantum computing or neuromorphic computing. Due to the increased effective thickness of the magnetic material to at least 50 nm, preferably at least 80 nm, more preferred to at least 100 nm, second-generation MRAM techniques, such as thermal-assisted switching (TAS) and spin-transfer torque (STT) become commercially possible. Specifically, the present invention is of importance for antiferromagnetic storage media since the reliability of these media can be significantly improved.

In the following the invention is illustrated by way of Examples.

EXAMPLES

Magnetic Material: Chiral Antiferromagnet $Mn_3Sn$

Metal: Tungsten (W)

Thin films of $Mn_3Sn$ with and without heavy metal layers are grown on top of an $Al_2O_3$ ($1\bar{1}02$) substrate using magnetron co-sputtering at an Argon pressure of 3 mTorr and a substrate temperature at 200° C. followed by in-situ annealing at 350° C. for 15 minutes. Then a bilayer of 8 nm W layer and 3 nm TaN (as oxidation protection) is sputtered on top at room temperature. The films were characterized by X-ray diffraction (XRD) which indicated a significant texture of the film with a preferential ($11\bar{2}0$) orientation of the sample surface. The Hall resistance measured on the bilayer sample ($Al_2O_3$/30 nm $Mn_3Sn$/8 nm W/3 nm TaN) at room temperature with a small current of 1 mA is shown in FIG. 1D. A large anomalous Hall resistance is found that arises from a reciprocal-space Berry curvature of the electronic bands.

Bilayer Film With a Thickness t=30 nm

At room temperature, when a magnetic field ($B_z$) is swept along the z axis (FIG. 1D top panel) between positive and negative values, the anomalous Hall resistance, $R_{xy}$, switches between ±50 mΩ and the coercivity is ~1 Tesla (FIG. 1D). This corresponds to a field-induced switching of m between two states characterized by $\varphi=90°$ (+z direction) and $\varphi=270°$ (−z direction) (FIG. 1E). Since these moments are perpendicular to the xy plane (see FIG. 1D top panel) of the measured Hall transport, the largest possible Hall signal is found for this geometry as compared to all of the following experiments. The signal of ±50 mΩ will be used as a reference point in the following. Furthermore, a decreasing $R_{xy}$ is observed with increasing temperature (FIG. 1F) until the maximum measurement temperature of 400 K, which is close to the magnetic ordering temperature of ~420 K, is reached (see section 1 of SM).

Current-Induced Switching

Figure 1C:
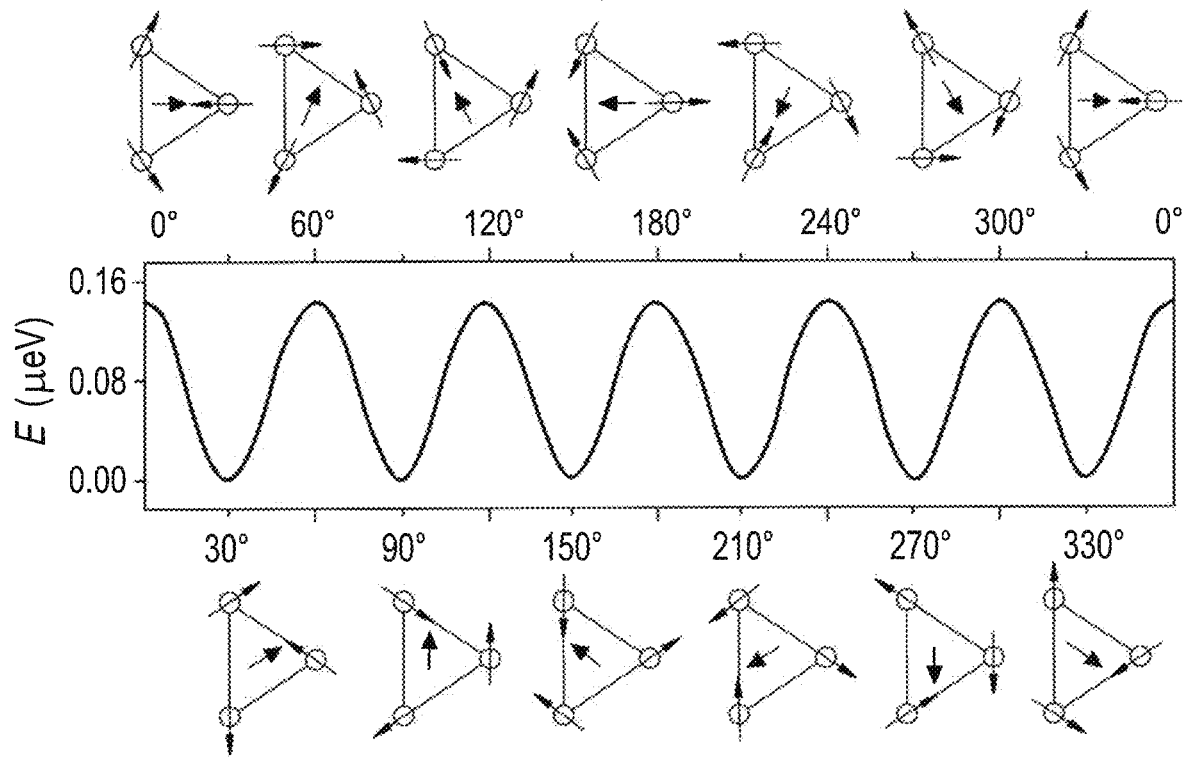
FIG. 1C is a graphical illustration of ground and excited states of an Mn triangle.
Figure 1D:
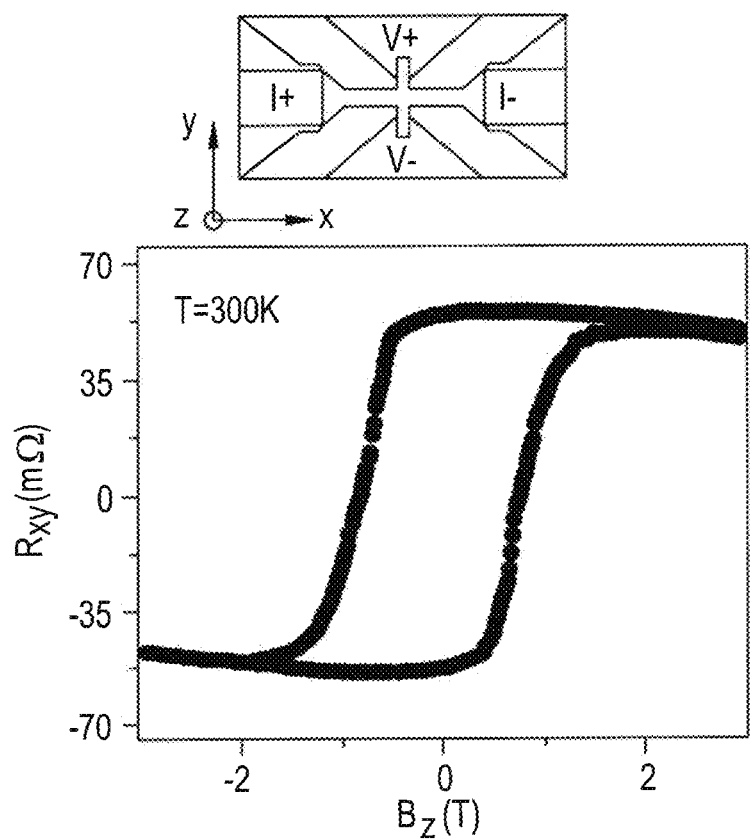
FIG. 1D is a graphical illustration of the anomalous Hall Resistance ($R_{xy}$) of an exemplary $Mn_3Sn$ bi-layer sample.
Figure 2A:
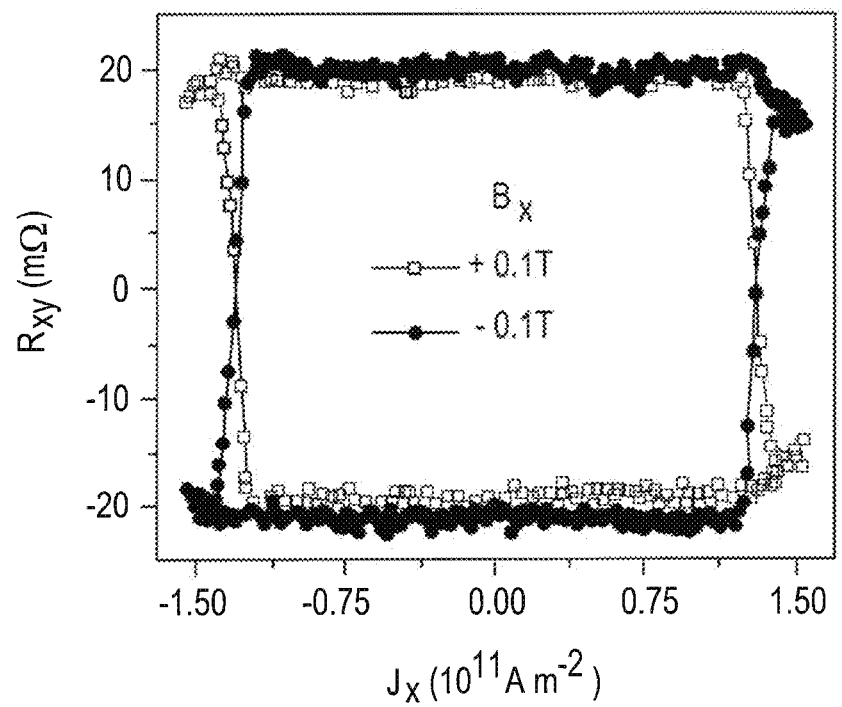
FIG. 2A is a graphical illustration of current-induced switching of exemplary $Mn_3Sn$ bi-layer sample.

Current-induced switching of the above film using 0.1 s long voltage pulses, with a magnitude of up to ±8 V, together with a small bias magnetic field, $B_x$, applied along the current direction which is defined as x, is shown in the top panel of FIG. 1D. The resulting magnetic state of the sample is probed by measuring $R_{xy}$ approximately 0.5 s after the end of the writing pulse with a small read current of 1 mA. Clear evidence for hysteretic current-induced switching of the magnetic state of the film is found, as shown in FIG. 2A, in the presence of a magnetic field, that has a component parallel to the current. Data are shown in FIG. 2A for positive (blue) and negative (red) $B_x$=100 mT. Note that the same color code is used throughout the description. The maximum values of $R_{xy}$=±20 mΩ measured from sweeping the current (FIG. 2A) are significantly smaller than those found in the field-induced switching experiment (FIG. 1D). Furthermore, the change in $R_{xy}$ is very sensitive to the magnitude of $B_x$: the maximum change in $R_{xy}$ was found for $B_x$=100 mT. The current-switching ratio ξ is defined as the ratio of the change in $R_{xy}$ engendered by current versus that found from magnetic field ($B_z$) in the presence of a small measurement current. Note that no current-induced switching is found for similar samples that were prepared without a metal layer.

Figure 1E:
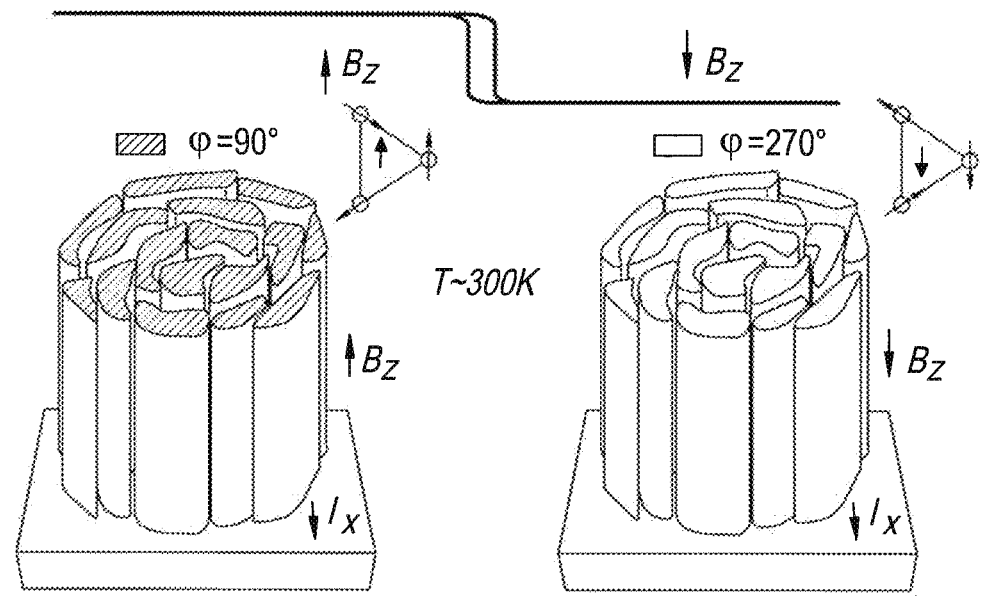
FIG. 1E is a schematic illustration of field induced switching.
Figure 1F:
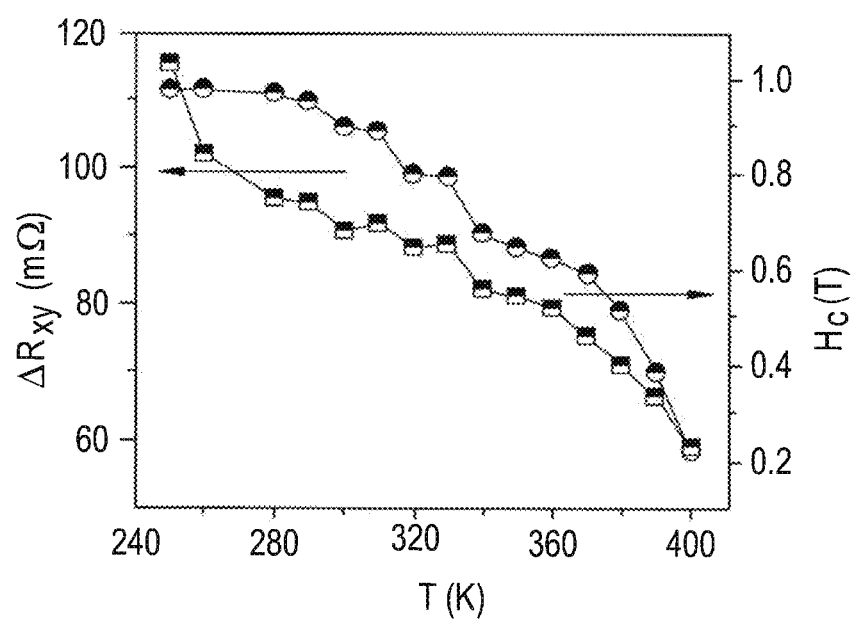
FIG. 1F is a graphical illustration of the change in $R_{xy}$ and $H_c$ at various temperatures.

One can account for the difference between the field- and current-induced changes in $R_{xy}$ using the various magnetic states (see FIG. 1C). In case of current switching, when a current is applied along x, the SHE in W injects a spin current with a polarization $s\|\pm y$ into the $Mn_3Sn$ layer, i.e., along $\varphi=0°$ or $\varphi=180°$, depending on the sign of the current.

Figure 2B:
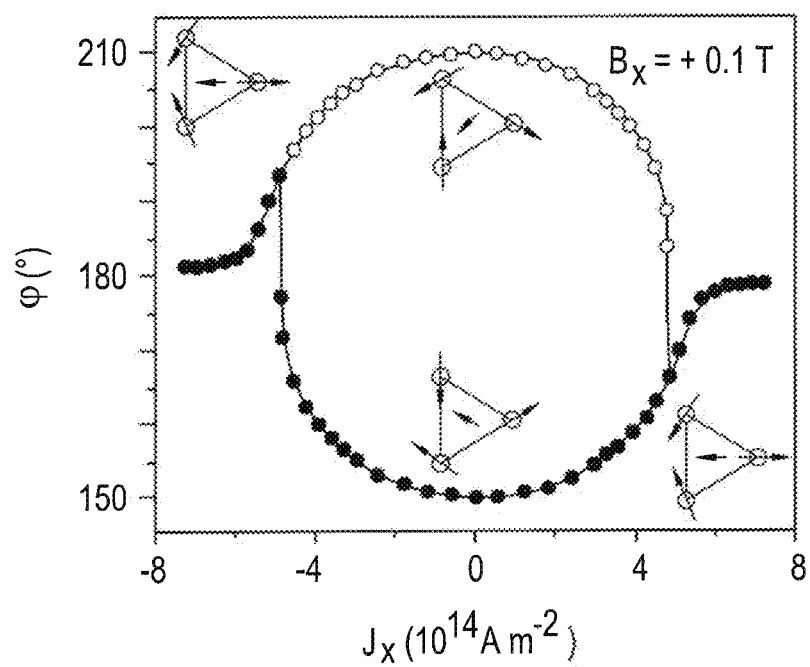
FIG. 2B is a graphical illustration of a theoretical model of current induced SOT switching.

If the current density is sufficiently large, the injected spin current orients all the magnetic configurations along these two unstable configurations (cf. energy maxima in FIG. 1C). Using atomistic simulations this change in the magnetic state can be calculated, as illustrated in FIG. 2B. The metastable states never reach exactly the injected spin orientations $\varphi=0°$ and $\varphi=180°$ but approach close to these values depending on the current density and $B_x$. The direction (sign with respect to z) of B×s determines whether $\varphi$ is slightly smaller or larger than these saturation values. When the current is turned off, the system then relaxes to the nearest energy minimum depending on the sign of B×s. This means that by reversing the current direction (and therefore s), the magnetic configurations are switched from either $\varphi=330°$ to 30° or from $\varphi=210°$ to 150° and vice-versa (depending on the $B_x$ direction), thereby changing the sign of the Hall voltage. For both metastable states, this corresponds to a switching between configurations with a projected net moment of $m_z=\pm0.5|m|$. Therefore, the theoretically highest possible Hall signal is half as large as that in the field-switching experiment, i.e., ~±25 mΩ here.

Figure 2C:
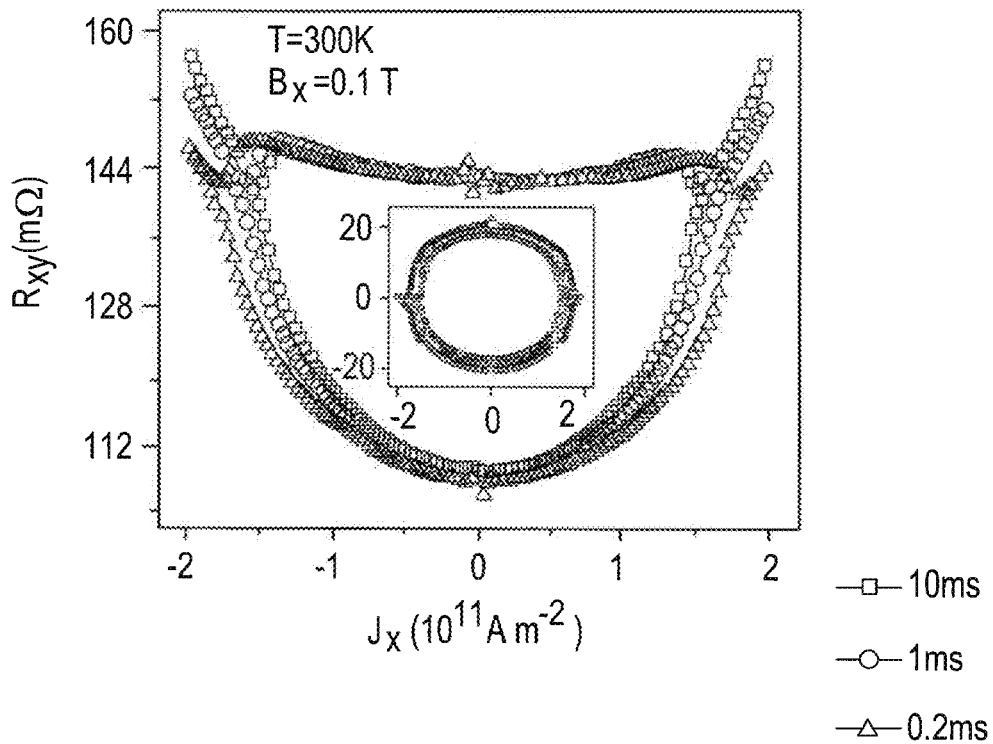
FIG. 2C is a graphical illustration of current induced switching for 3 different current pulse lengths.
Figure 2D:
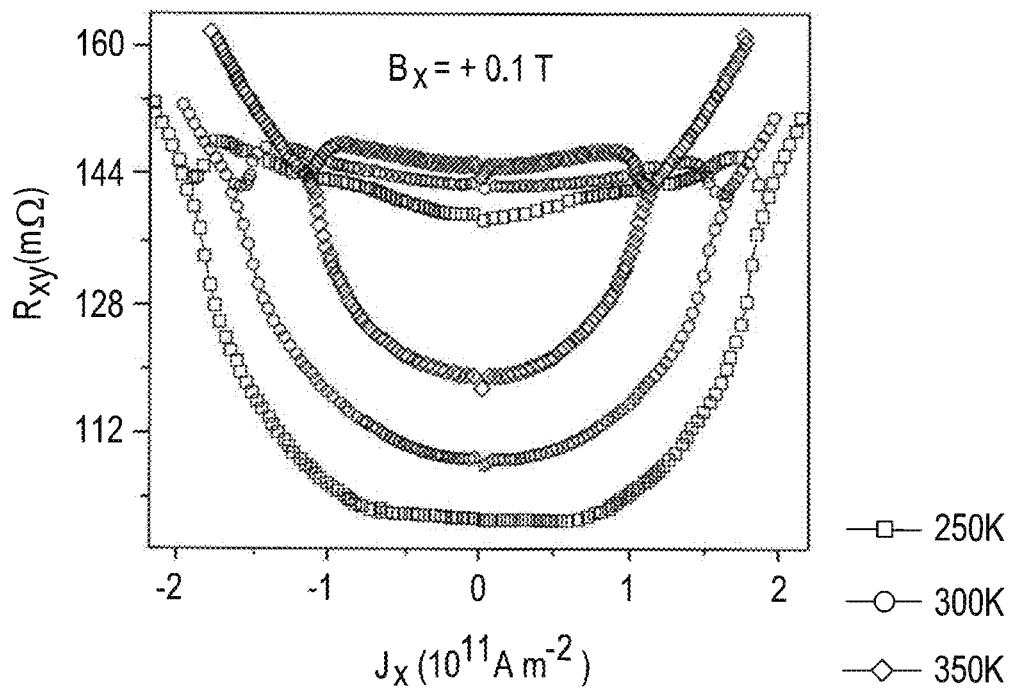
FIG. 2D is a graphical illustration of switching experiments at different temperatures.
Figure 2E:
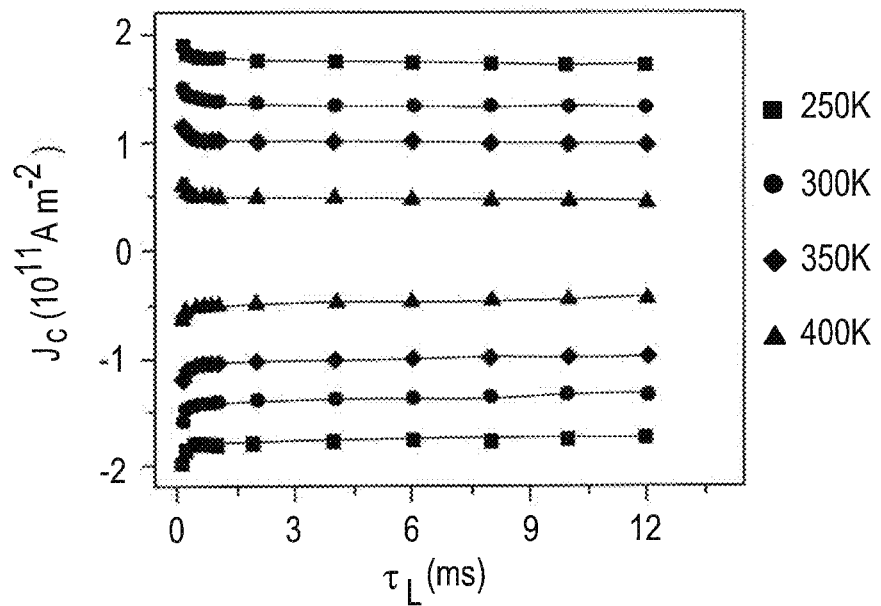
FIG. 2E is a graphical illustration of dependency of critical current density ($J_c$) on pulse length and temperature.

A very important point is that the calculated switching current density ($J_c$) in the model (FIG. 2B) is much higher than compared to the experimentally measured $J_c$ (FIG. 2A). This discrepancy in $J_c$ suggests that a pure SOT mechanism is not sufficient to account for the actual switching mechanism, even though the model calculations rely strongly on particular choices of parameters and, therefore, might not be quantitatively accurate. To help resolve this dilemma, additional switching experiments were performed in which a single current pulse is used for simultaneous writing and reading, so that the state of the system during the writing process is probed (rather than the state after thermal relaxation, as in the measurements discussed above). FIG. 2C shows the recorded variation of $R_{xy}$ at room temperature for three different current pulse lengths, as the intensity of the current is swept between ±60 mA. Here, $R_{xy}$ changes rapidly with increasing current in each case until a critical current density for switching, $J_c$ is reached. After subtracting the background (determined from zero magnetic field data, for which there is no switching), the dependence of $R_{xy}$ on current (inset of FIG. 2C) closely resembles the simulated curve in FIG. 2B. $R_{xy}$ goes to zero for currents above $J_c$ because the SOT orients m almost along either $\varphi=0°$ or $\varphi=180°$ that corresponds to $m_z=0$. $J_c$ decreases slightly with increasing current pulse length which is attributed to heating of the sample, which is essential for switching. Furthermore, when the experiments are carried out at higher temperature, smaller values of $J_c$ are needed, as shown in FIG. 2D. The dependence of $J_c$ on the voltage pulse length and as a function of temperature, is summarized in FIG. 2E. To estimate the sample temperature during the writing pulse application, the dependence of the longitudinal resistance on temperature was measured using a small DC current (i.e. no Joule heating). It was found that the longitudinal resistivity of the sample at $J_c$ corresponds to a sample temperature that is close to the magnetic transition temperature (420 K), for all current pulse lengths.

Figure 2F:
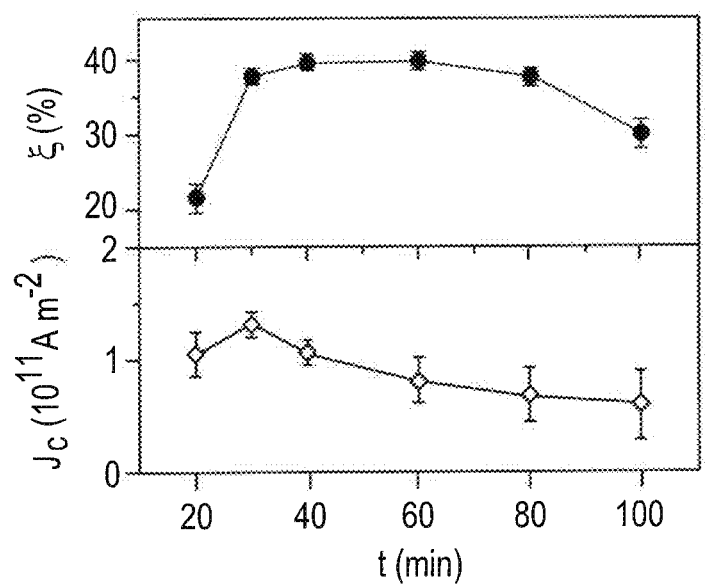
FIG. 2F is a graphical illustration of effect of film thickness on switching ratio and $J_c$.

The spin diffusion length in $Mn_3Sn$ has been reported to be less than one nm (30), much smaller than the thickness of the $Mn_3Sn$ thin-films used here, which, thereby, makes a pure SOT mechanism unlikely. Indeed, it was found that $Mn_3Sn$ films even as thick as 100 nm can be switched and, moreover, that $J_c$ is independent of thickness (for thicknesses varying from 20 to 100 nm), as shown in FIG. 2F. Another important point that was found is that ξ is almost constant for thicknesses between 30 nm and 80 nm. A decrease in ξ for the 100 nm and 20 nm thin films can be attributed to their higher roughness.

Figure 3B:
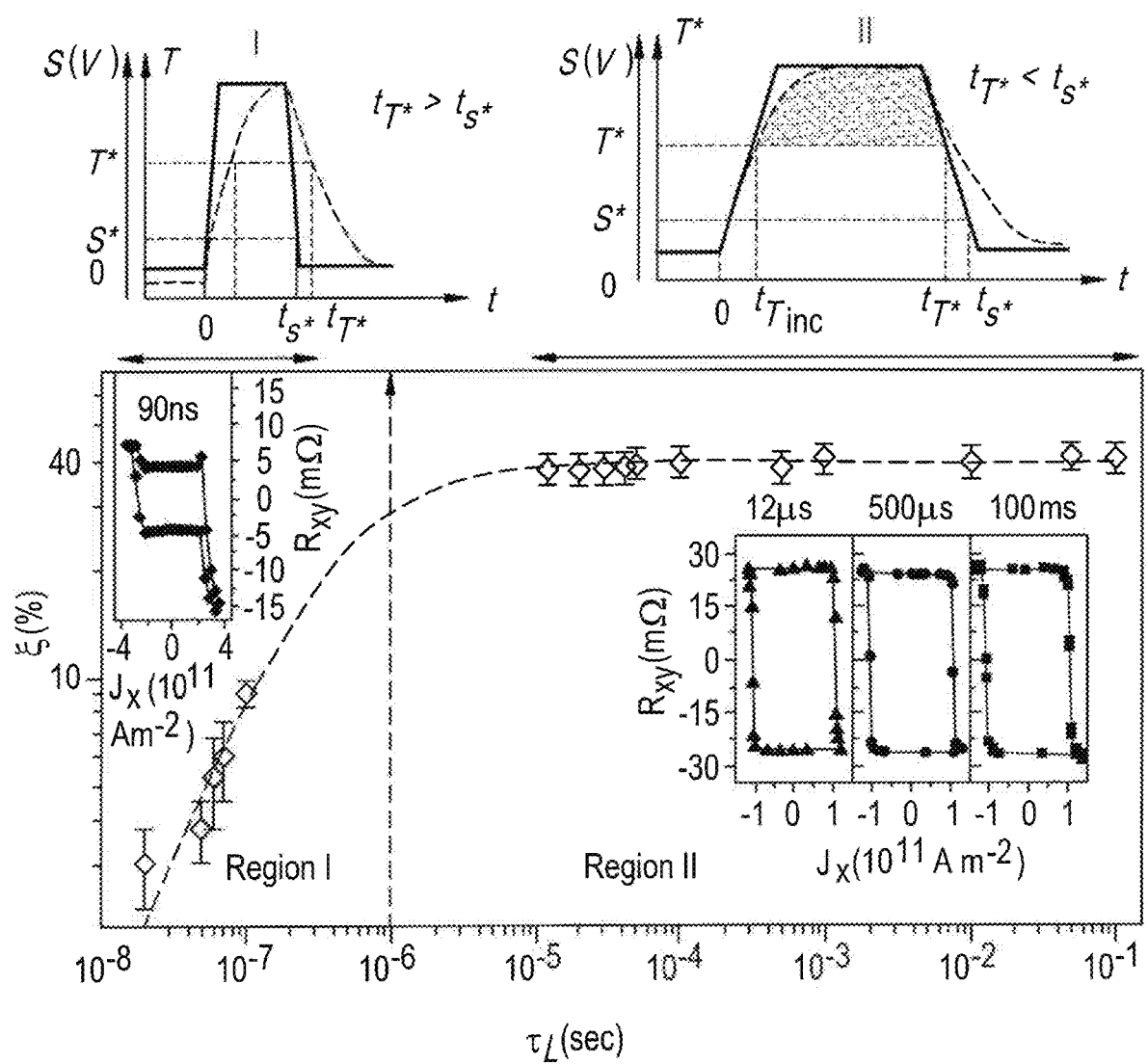
FIG. 3B is a graphical illustration of the effect of various current pulses on the switching ratio.

Based on the findings reported above, the new mechanism of Seeded-Spin-Orbit-Torque (SSOT) is proposed as shown schematically in FIG. 3A. Three states of the device are shown corresponding to the state set after large negative and positive current pulses had been applied (case I and case III, respectively) and the excited state during the application of a large positive current (case II). The current heats the device above the so-called blocking temperature (T*) so that there is insufficient magnetic anisotropy to maintain a given AF domain configuration. The domains are thermally unstable and all domain configurations are thermodynamically populated. Note that the blocking temperature is below the Néel temperature. The spin current from the SHE in the W layer sets the orientation of the AF domains in a thin region ($\lambda_s$) at the $Mn_3Sn$/W interface (grey region in case-II) so that once the current is switched off, this interface region seeds the domain configuration of the bulk of the AF layer (red region in case II). Clearly, this mechanism is only effective if the device cools through T* while the SOT is effective. Thus, the fall-time of the current pulse is critical. If the current pulse fall time is too short then this would not be true (see FIG. 3B). The quadratic dependence of heating on the current means that the sample temperature has a stronger dependence on current than the SOT.

To confirm this hypothesis, detailed current-induced switching measurements with current pulses of varying lengths and distinct rise and fall times were carried out (FIG. 3B). Two types of current pulses were used, in which, firstly, the pulse length was varied from 20 ns to 100 ns with a fall time of 750 ps, and, secondly, the pulse length was varied from 12 μs to 100 ms with a fall time of ~20 ns. In the latter case, the system always exhibits the same ξ~40%, irrespective of the pulse length. By contrast, in the first case ξ<<40%, even when very high voltages were used (until the sample broke down). This behavior could be due to, either less heating of the sample due to the short pulse length, and/or thermal fluctuations of the domain configuration in the seed layer as the SOT is switched off before the sample has sufficiently cooled. The temporal evolution of the device temperature using finite element modeling was estimated. It was found that the sample's temperature will readily exceed the Néel temperature within ~100 ns, when the applied current density is large enough, therefore ruling out the first mechanism. However, if the current is turned off abruptly, the time for the sample to cool significantly is ~10-20 ns. Thus, consistent with the SSOT hypothesis, when the fall time of the current pulse is short, incomplete switching is obtained because the seed layer is still too hot when the spin current has been removed to seed the setting of the AF domain configuration of the entire layer.

Figure 4A:
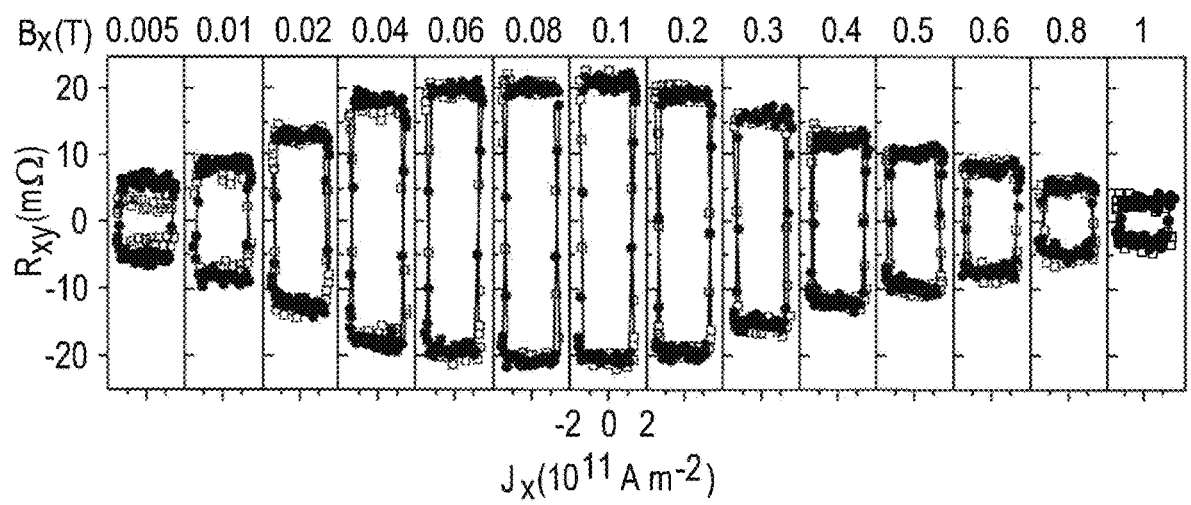
FIG. 4A is a graphical illustration of $R_{xy}$ during current switching at various bias fields ($B_x$)
Figure 4B:
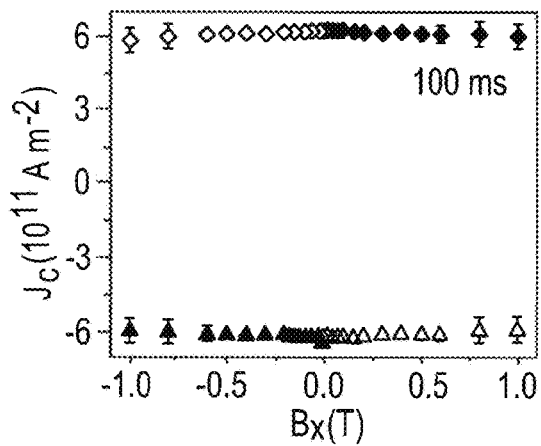
FIG. 4B is a graphical illustration of dependence of $J_c$ on $B_x$.
Figure 4C:
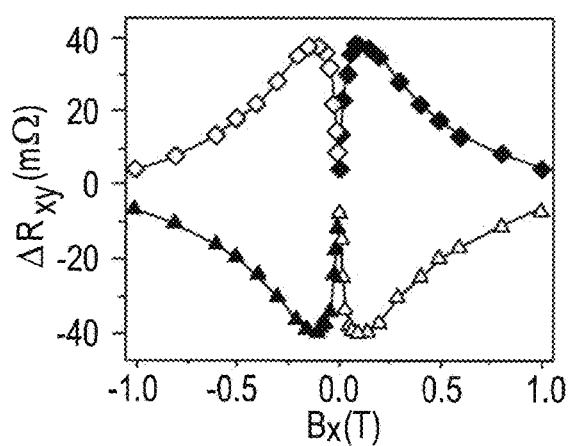
FIG. 4C is a graphical illustration of dependence of $\Delta R_{xy}$ on $B_x$.
Figure 4D:
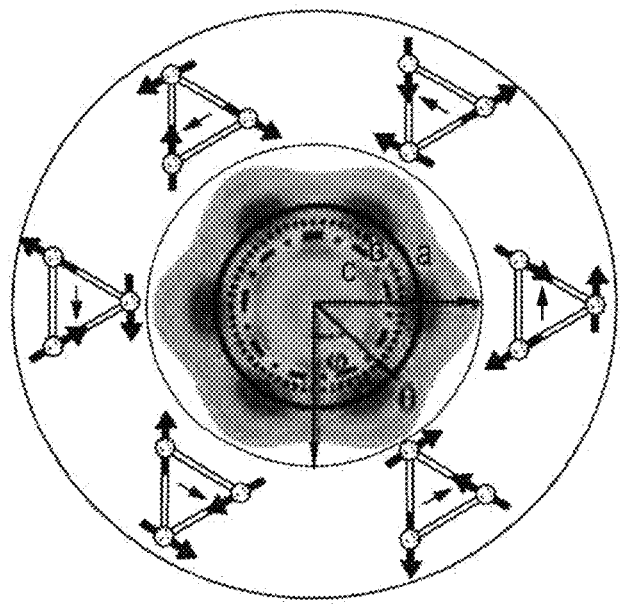
FIG. 4D is a schematic illustration of the magnetic energy landscape of $Mn_3Sn$.
Figure 4E:
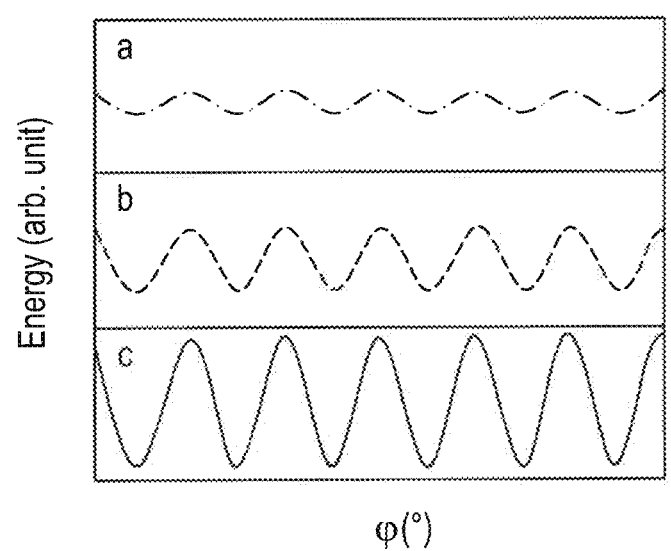
FIG. 4E is a graphical illustration of total energy versus configuration.

The current-induced switching preferably for AFs and more preferred for chiral AFs can also be carried out in the presence of a bias magnetic field. In this case the switching is highly dependent on the magnetic fields magnitude and direction, as is shown in detail here. In FIG. 4A, the bias field dependence of $R_{xy}$ is displayed and the corresponding $J_c$ and change in Hall resistance ($\Delta R_{xy}$) for different magnetic fields is shown in FIGS. 4B and 4C, respectively. It was found that $J_c$ has no dependence on $B_x$ and remains constant when $B_x$ is varied between ±1 T. On the other hand, $\Delta R_{xy}$ exhibits an intriguing non-monotonic dependence on $B_x$ (FIG. 4C). For a bias field close to zero, $\Delta R_{xy}$ is negligibly small. However, with increasing $B_x$, $\Delta R_{xy}$ increases until it reaches a maximum value near $B_x^{max}$ (~0.1 T) beyond which it decreases. These variations of $J_c$ and $\Delta R_{xy}$ on $B_x$ are a consequence of the current-induced thermally excited state. It is noted that these dependences of $J_c$ and $\Delta R_{xy}$ are in contrast with the SOT switching of a FM where $J_c$ rather decreases monotonically with increasing $B_x$ (since the damping like torque is supplemented by $B_x$) and $\Delta R_{xy}$ remains constant, independent of $B_x$.

During switching, when the applied current exceeds $J_c$, the spin current from W with polarization s‖±y aligns the net moment m of $Mn_3Sn$ along φ=180°±Δφ (or 0°∓Δφ) (FIG. 2B) where Δφ is proportional to B×s, as explained earlier. For $B_x$=0, Δφ is zero and therefore m is aligned exactly along φ=180° (or 0°). In this case, when the current is turned off, the system relaxes from a φ=180° (or 0°) state to either of the two stable configurations, φ=150° and 210° (or 30° and 330°), with equal probability (see section 9 of SM). Therefore, the switching at $B_x$=0 becomes non-deterministic, resulting in $\Delta R_{xy}$ being close to zero. However, the application of a finite $B_x$ makes Δφ finite. m tilts slightly out of the kagome plane, generating another torque m×s (determined by B×s) that slightly rotates m in the kagome plane. Consequently, in the excited state, m is now tilted at an angle±Δφ away from φ=180° (or 0°) depending on the sign of B×s. In this scenario, when the current is turned off, a state with φ=180+Δφ (or 0−Δφ) is more likely to switch towards φ=210° (or 330°), with $m_z$=−0.5|m|), whereas a state with φ=180−Δφ (or 0+Δφ) is more likely to switch towards φ=150° (or 30°), with $m_z$=+0.5|m|. Thus, a finite Δφ assists the system in achieving a deterministic switching. As the magnitude of $B_x$ is increased it gives rise to a larger Δφ which, in turn, leads to a greater probability of deterministic switching and, thereby, an increase in $\Delta R_{xy}$, until $B_x^{max}$ is reached. Beyond $B_x^{max}$, another effect becomes relevant. The decrease of $\Delta R_{xy}$ beyond $B_x^{max}$ can be qualitatively understood from the energy landscape (FIG. 1, B) due to tilting of the magnetic moments away from the magnetic easy axes out of the yz (kagome) plane. As m tilts out of the kagome plane, the energy landscape with respect to φ becomes flatter, as is schematically shown in FIG. 4, D and E. This means that the thermal fluctuations between different domains is amplified, effectively decreasing $\Delta R_{xy}$.

Figure 5A:
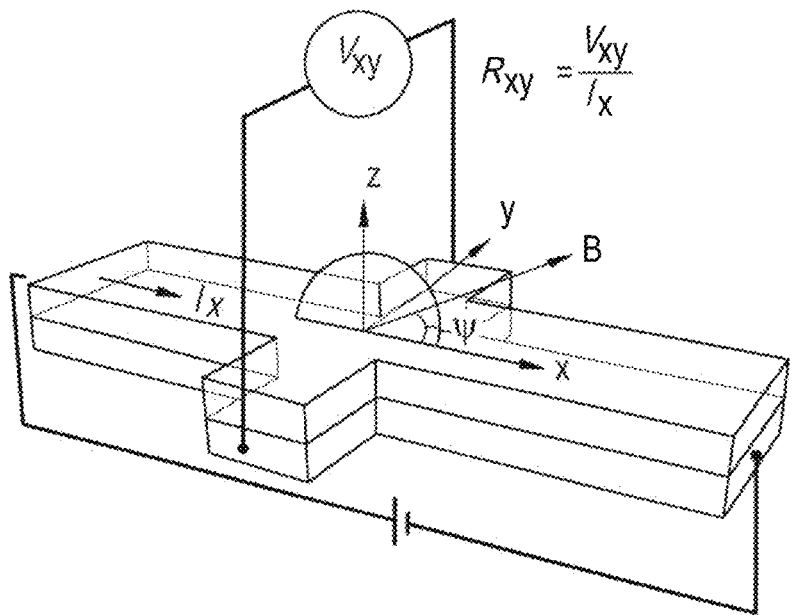
FIG. 5A is a schematic illustration of a measurement protocol.
Figure 5B:
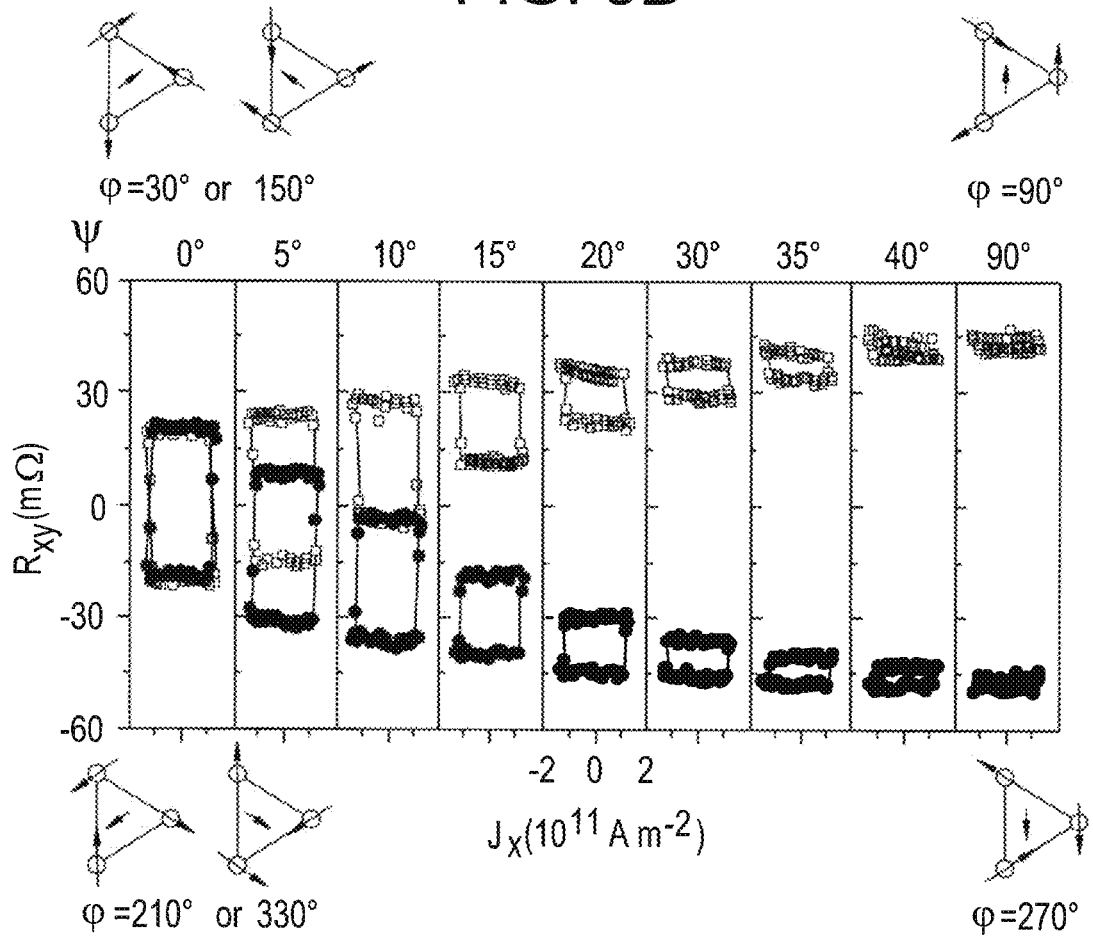
FIG. 5B is a graphical illustration of $R_{xy}$ versus field angle.
Figure 5C:
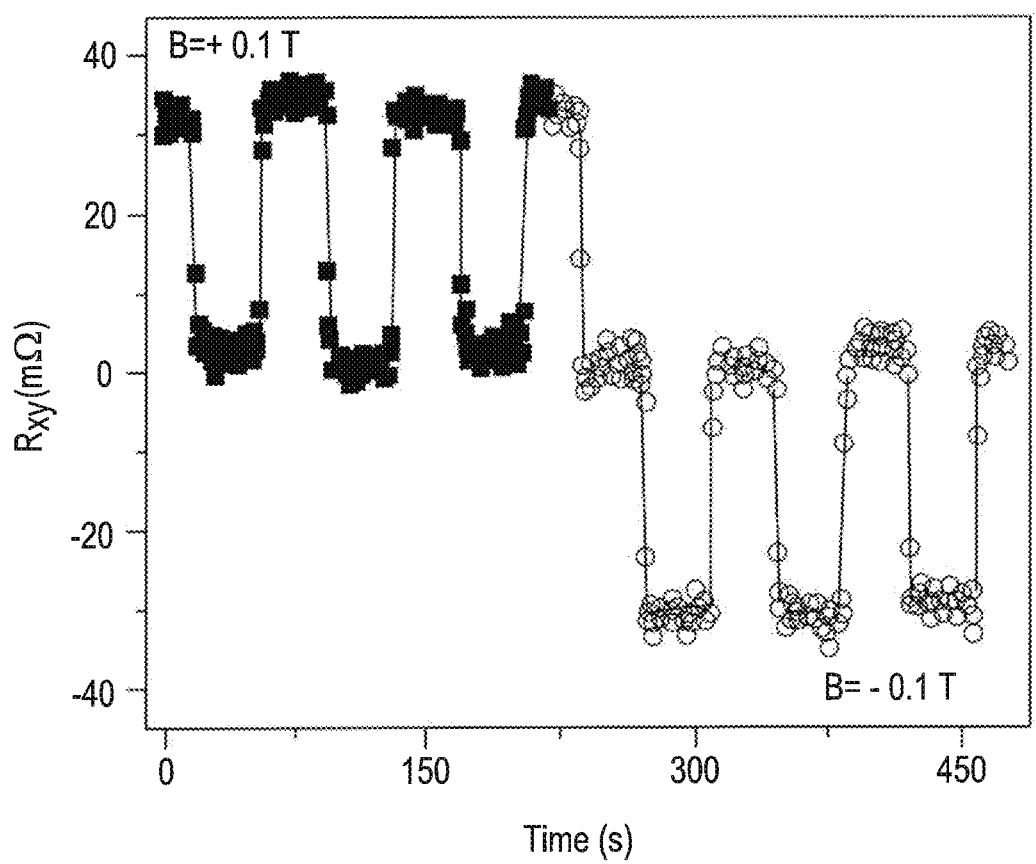
FIG. 5C is a graphical illustration of the effect on $R_{xy}$ in the presence of B=±0.1T.

Thus far, two distinct switching mechanisms have been discussed: A field switching mechanism, when the field $B_z$ is oriented along φ=±90°, and a SSOT switching, for which a field perpendicular to the kagome plane ($B_x$) provides a bias Δφ during the switching. Next, the combination of both effects were explored. A field of ±100 mT was applied at an angle ψ with respect to x and within the xz plane (FIG. 5A). A very interesting finding is that there are now 4 distinct $R_{xy}$ states whose magnitudes are highly sensitive to ψ as shown in FIG. 5B. At ψ=0°, $R_{xy}$=±20 mΩ is measured; the same value as discussed earlier for B oriented along ±x. Once B is tilted away from x, it was observed that there are two branches for $R_{xy}$, corresponding to ±B, shown in FIG. 5B as blue and red. For each ψ along each branch, the sample can be switched hysteretically by current, between two distinct $R_{xy}$ states, whose difference decreases with increasing ψ. The average values of these states are shifted either upwards (blue) and downwards (red) from zero, as ψ is varied away from zero. $R_{xy}$ can also be switched from the red to the blue hysteresis curve when the field is reversed but only if the critical current is exceeded. In particular, for ψ=90°, the maximum values of $R_{xy}$ in each of the branches approaches those values obtained in pure magnetic field switching i.e. ±50 mΩ (see FIG. 1D). However, here a field of just 100 mT is required as compared to 1T needed for pure field switching. The difference is caused by the heating provided by the current. Note that for ψ=90° the SOT provided by the current has no effect on the switching and, therefore, cannot provide a seeding layer. Still, it heats up the sample and the magnetic field ($B_z$ along φ=±90°) provides the bias throughout the whole $Mn_3Sn$ layer. In short, the field-switching mechanism is also strongly affected by current-induced heating in a favorable way. Finally, FIG. 5C shows how the 4 states can be accessed for ψ=10° by applying current pulses in the presence of B=±0.1 T. There are 4 distinct $R_{xy}$ states that can be accessed by a current-induced switching mechanism that is strongly influenced by relatively small magnetic fields. These 4 states do not correspond to four individual magnetic phases but to different ratios of the six energetically preferred states presented in FIG. 1, B and C.

The invention claimed is:

1. A method for switching magnetic moments in a magnetic material, comprising the steps of:
   d) heating a system comprising
      a layer of the magnetic material and
      a layer of a metal which is in contact with one surface of the magnetic material layer, thus forming an interface with the magnetic material layer
   e) applying current pulses to the system, wherein the current pulses have a current pulse fall time,
   wherein
      the system is heated to at least 1 to 100 K above the magnetic material blocking temperature,
   the current pulses are applied at least at a point in time when the system is heated to at least 1 to 100 K above the blocking temperature of the magnetic material, thereby generating a spin texture in the magnetic material layer and
   f) then cooling the system to a temperature of below the blocking temperature of the magnetic material at a cooling rate which is greater than the current pulses fall time, thereby setting the spin texture in the magnetic layer.

2. The method according to claim 1, wherein the magnetic material is selected from the group consisting of ferrimagnetic material, ferromagnetic material, normal antiferromagnetic (AF) material and chiral antiferromagnetic material.

3. The method according to claim 1, wherein the metal is selected from the group consisting of: a heavy metal element, a heavy metal compound, and a topological metal.

4. The method according to claim 3, wherein the heavy metal exhibits spin orbit coupling.

5. The method of claim 3, wherein the metal is selected from the group consisting of W, Au, Ag, Pt and Pd.

6. The method according to claim 1, wherein the system comprising the magnetic layer and the metal layer has a planar dimension of from about 10 nm·10 nm to 100 nm·100 nm or from 10 nm·1 µm to 100 nm·10 µm.

7. The method according to claim 1, wherein the magnetic material layer has a thickness of at least 10 nm.

8. The method according to claim 1, wherein the metal layer has a thickness of at least 3 nm.

9. The method according to claim 1, wherein the blocking temperature is a temperature that is between 10% and 20% below the magnetic material's magnetic ordering temperature.

10. The method according to claim 1, wherein the heating in step a) is through the current applied in step b).

11. The method according to claim 1, wherein the method is carried out in a magnetic field.

12. The method according to claim 11, wherein the magnetic field strength is 10-1000 Oe.

13. The method according to claim 11, wherein step b) of the method is carried out in a magnetic field.

14. A spintronic technology comprising the method according to claim 1.

15. The spintronic technology of claim 14, wherein the spintronic technology is in the field of quantum computing or neuromorphic computing.

16. A second-generation MRAM technique comprising the method according to claim 1.

17. The second-generation MRAM technique according to claim 16, wherein the technique is in thermal-assisted switching (TAS) or spin-transfer torque (STT).

18. An antiferromagnetic storage media comprising the method according to claim 1.

* * * * *